US009409535B2

(12) United States Patent
Nakamura

(10) Patent No.: US 9,409,535 B2
(45) Date of Patent: Aug. 9, 2016

(54) CONTROL DEVICE FOR OCCUPANT PROTECTION DEVICE
(71) Applicant: Autoliv Development AB, Vårgårda (SE)
(72) Inventor: Yoriko Nakamura, Yokohama (JP)
(73) Assignee: AUTOLIV DEVELOPMENT AB, Vargarda (SE)
( * ) Notice: Subject to any disclaimer, the term of this patent is extended or adjusted under 35 U.S.C. 154(b) by 0 days.
(21) Appl. No.: 14/434,607
(22) PCT Filed: Sep. 2, 2013
(86) PCT No.: PCT/JP2013/073581
§ 371 (c)(1),
(2) Date: Apr. 9, 2015
(87) PCT Pub. No.: WO2014/065008
PCT Pub. Date: May 1, 2014
(65) Prior Publication Data
US 2015/0283968 A1 Oct. 8, 2015
(30) Foreign Application Priority Data
Oct. 24, 2012 (JP) ................................. 2012-235209
(51) Int. Cl.
*B60Q 1/00* (2006.01)
*B60R 21/00* (2006.01)
*B60R 21/0136* (2006.01)
(52) U.S. Cl.
CPC ............. *B60R 21/00* (2013.01); *B60R 21/0136* (2013.01); *B60R 2021/0027* (2013.01)
(58) Field of Classification Search
CPC ................ B60R 21/00; B60R 21/0136; B60R 2021/0027
USPC ............... 340/435, 436, 425.5; 701/300, 301; 180/271
See application file for complete search history.

(56) References Cited

U.S. PATENT DOCUMENTS 5,892,435 A * 4/1999 Buchheim ........... B60R 21/0132
340/436
6,373,147 B1 * 4/2002 Miyaguchi ............ B60R 21/013
340/436

(Continued)

FOREIGN PATENT DOCUMENTS

| JP | 2002-046570 A | 2/2002 |
| JP | 2002-096708 A | 4/2002 |
| JP | 2005-306185 A | 11/2005 |

OTHER PUBLICATIONS

Japanese Patent Office, English Translation of International Search Report of International Application No. PCT/JP2013/073581, Mailed on Oct. 8, 2013, one page.

*Primary Examiner* — Eric M Blount
(74) *Attorney, Agent, or Firm* — Brinks Gilson & Lione

(57) ABSTRACT

The occurrence of a vehicle collision is determined using an output signal of one satellite sensor disposed offset from a vehicle center line. A control device for an occupant protection device includes: an acceleration sensor disposed at a front position of a vehicle; and a control unit that determines the occurrence of a collision based on an output signal of the acceleration sensor and operates an occupant protection device. The acceleration sensor is one satellite sensor disposed so as to be offset in a vehicle width direction from a vehicle front center position. The control unit includes: a first threshold setting unit that sets a first threshold so as to correspond to a traveling speed of the vehicle; and a determining unit that compares a level of the output signal of the acceleration sensor with the first threshold to determine the occurrence of a collision.

7 Claims, 16 Drawing Sheets

(56) References Cited

U.S. PATENT DOCUMENTS 8,855,884 B1* 10/2014 Fujitsuka .............. B60R 21/015 180/271

8,996,236 B2* 3/2015 Mack .................... B60R 21/013 180/274

2005/0109075 A1* 5/2005 Kithil .................... G01L 5/0052 73/12.09

\* cited by examiner

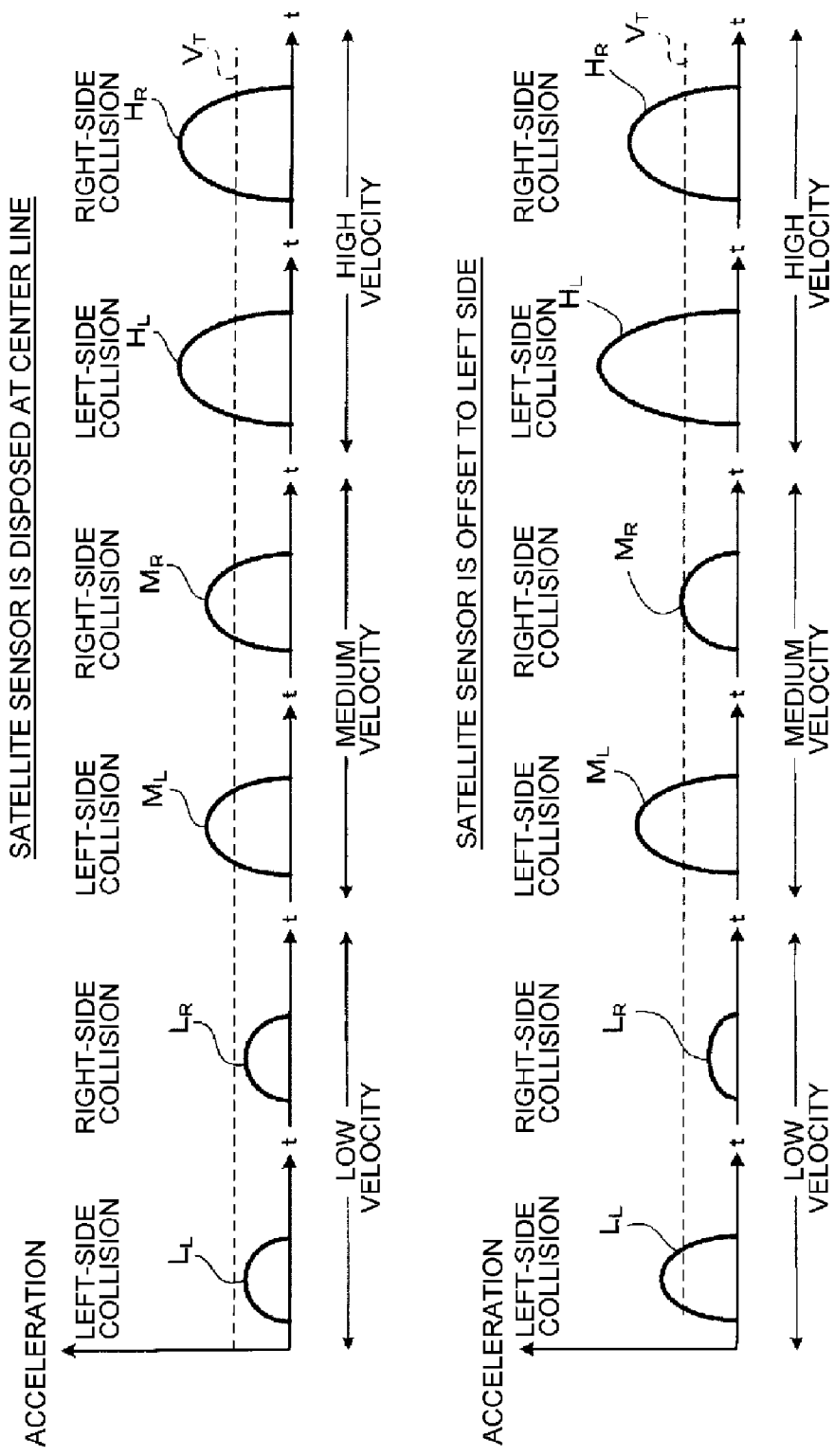

CONTROL DEVICE FOR OCCUPANT PROTECTION DEVICE

BACKGROUND

1. Field of the Invention

The present invention relates to a control device for an occupant protection device, for controlling activation of the occupant protection device such as a seat belt device or an airbag device that protects an occupant in the event of a vehicle collision. More particularly, the present invention relates to a control device for an occupant protection device, which uses output signals of satellite sensors (collision detectors) arranged on a vehicle front side so as to be offset from a center position in a vehicle width direction.

2. Description of Related Art

An occupant protection device such as an airbag device or a seat belt device is provided in order to protect an occupant of a vehicle from an impact in the event of a collision. When a vehicle collides with an obstacle, a collision detection sensor outputs a detection signal to a control device to operate the occupant protection device. For example, although the collision detection sensor (a main sensor) is provided in the control device disposed in a central portion (for example, a center floor) of a vehicle, it is desirable to additionally provide a collision sensor (a satellite sensor) for detecting a collision in a crash zone or the like of a vehicle front portion in order to detect a vehicle collision quickly and to protect an occupant appropriately. For example, Japanese Patent Application Publication No. 2005-306185 discloses a configuration in which one or a plurality of satellite sensors is disposed in a vehicle front portion. Specifically, it is proposed that an occupant protection device be controlled based on an output signal having the highest signal level among the deceleration output signals of a plurality of collision detection sensors (acceleration sensors), to thereby reduce the possibility of breaking, damage, or the like of the collision detection sensors.

For example, when two satellite sensors are disposed in the vehicle front portion, the satellite sensors are disposed at symmetrical positions in relation to a center line in a vehicle width direction (extending in a vehicle front-rear direction). Moreover, when one satellite sensor is disposed in the vehicle front portion, the satellite sensor is generally disposed on a vehicle center line. When the satellite sensor is disposed on the center line, it is convenient because detection sensitivity characteristics do not vary depending on a collision position on the vehicle front side when detecting a head-on collision (a frontal collision), an offset collision (a vehicle front-right side collision or a vehicle front-left side collision), or other collisions.

However, when one satellite sensor is disposed in the vehicle front portion, it may not be possible to dispose the satellite sensor on the vehicle center line due to vehicle design conditions. In this case, the following problems may occur.

For example, when a satellite sensor is disposed closer to the left side than the vehicle center line, the satellite sensor outputs a high-level detection signal in the event of a vehicle front-left side collision (because the satellite sensor is disposed relatively close to the collision position) even if the collision speed is the same. Moreover, the satellite sensor outputs a low-level detection signal in the event of a vehicle front-right side collision (because the satellite sensor is disposed relatively distant from the collision position). From the detection signal of the satellite sensor, it is difficult to distinguish between a vehicle front-left side collision with a relatively low collision speed and a vehicle front-right side collision with a relatively high collision speed. The same problem occurs when the satellite sensor is disposed closer to the right side than the vehicle center line.

For example, one satellite sensor may be disposed on the left side of the vehicle center line and one satellite sensor for compensation of detection characteristics may be disposed on the right side of the vehicle center line. In this case, for example, the detection sensitivity can be compensated for by calculating an average value of the output values of the two satellite sensors or by selecting the higher value of the output values. However, such a detection sensitivity compensation method cannot be employed when only one satellite sensor is used.

SUMMARY

Therefore, an object of the present invention is to provide a control device for an occupant protection device, in which the occurrence of a vehicle collision can be determined using an output signal of one satellite sensor disposed to be offset from a vehicle center line.

According to an aspect of the present invention, there is provided a control device for an occupant protection device, including: an acceleration sensor disposed at a front position of a vehicle; and a control unit that determines the occurrence of a collision based on an output signal of the acceleration sensor and operates the occupant protection device, wherein the acceleration sensor is one satellite sensor disposed offset in a vehicle width direction from a vehicle front center position, and the control unit includes: a first threshold setting unit that sets a first threshold so as to correspond to a traveling speed of the vehicle; and a determining unit that compares a level of the output signal of the acceleration sensor with the first threshold to determine the occurrence of a collision.

With such a configuration, the accuracy of collision determination can be improved by taking the vehicle speed into consideration in collision determination based on a detection signal (an acceleration signal) of one satellite sensor disposed on the vehicle front side at a position offset from the center position in the vehicle width direction.

According to another aspect of the present invention, there is provided a control device for an occupant protection device, including: an acceleration sensor disposed at a front position of a vehicle; and a control unit that determines the occurrence of a collision based on an output signal of the acceleration sensor and operates the occupant protection device, wherein the acceleration sensor is one satellite sensor disposed offset in a vehicle width direction from a vehicle front center position, and the control unit includes: a calculating unit that integrates the output signal of the acceleration sensor to output a speed signal; a second threshold setting unit that sets a second threshold so as to correspond to a traveling speed of the vehicle; and a determining unit that compares a level of the speed signal with the second threshold to determine the occurrence of a collision.

With such a configuration, the accuracy of collision determination can be improved by taking the vehicle speed into consideration in collision determination based on a detection signal (a speed signal) of one satellite sensor disposed on the vehicle front side at a position offset from the center position in the vehicle width direction.

According to still another aspect of the present invention, there is provided a control device for an occupant protection device, including: an acceleration sensor disposed at a front position of a vehicle; and a control unit that determines the occurrence of a collision based on an output signal of the acceleration sensor and operates the occupant protection device, wherein the acceleration sensor is one satellite sensor disposed offset in a vehicle width direction from a vehicle front center position, and the control unit includes: a calculating unit that integrates the output signal of the acceleration sensor to output a speed signal; a first threshold setting unit that sets a first threshold so as to correspond to a traveling speed of the vehicle; a second threshold setting unit that sets a second threshold so as to correspond to the traveling speed of the vehicle; a first determining unit that compares a level of the output signal of the acceleration sensor with the first threshold to determine the occurrence of a collision; and a second determining unit that compares the level of the speed signal with the second threshold to determine the occurrence of a collision.

With such a configuration, the accuracy of collision determination can be improved by taking the vehicle speed into consideration in collision determination based on a detection signal (an acceleration signal or a speed signal) of one satellite sensor disposed at a position offset from the center position in the vehicle width direction.

Preferably, the second threshold is expressed as a function of time elapsed from the occurrence of a collision, and time-change characteristics of the second threshold are set in accordance with the vehicle speed. By doing so, it is possible to reduce the possibility of collision detection errors.

Preferably, the second threshold is expressed as a function of time elapsed from the occurrence of a collision, and time-change characteristics of the second threshold in an initial stage of collision are changed in accordance with the vehicle speed. By doing so, it is possible to reduce the possibility of collision detection errors.

The present invention is advantageous in that the occurrence of a collision (even an offset collision) can be determined using the output signal of one satellite sensor disposed to be offset from the vehicle front center position by referring to the vehicle speed.

BRIEF DESCRIPTION OF THE DRAWINGS

FIGS. 4A and 4B are diagrams describing examples of output signals when a satellite sensor disposed offset from a center line detects an offset collision;

DETAILED DESCRIPTION

Figure 1:
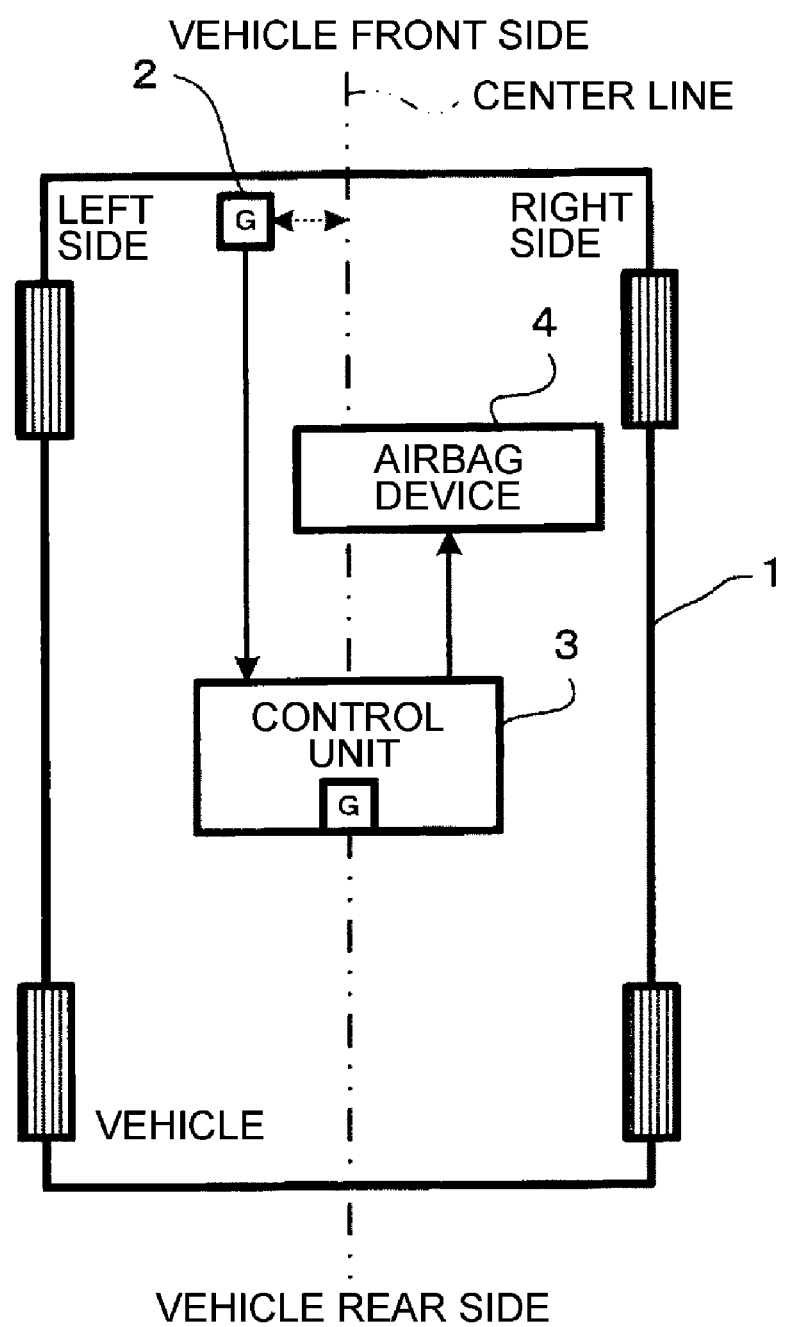
FIG. 1 is a diagram describing an entire configuration of the present invention.

Embodiments
(First Embodiment)

Hereinafter, embodiments of the present invention will be described with reference to the drawings. In the respective drawings, the corresponding portions will be denoted by the same reference numerals, and a recurrent description of those portions will not be provided.

FIG. 1 is a schematic diagram of a control system for protecting an occupant of a vehicle. As illustrated in the drawing, a center line is assumed in a vehicle front-rear direction at the center in a width direction of a vehicle 1. In this embodiment, one acceleration sensor for detecting a collision is disposed on the left side of the center line in an impact absorbing zone on the vehicle front side as a satellite sensor 2. The satellite sensor 2 detects a deceleration resulting from a collision and outputs an electrical signal. An output signal (a detection signal) of the satellite sensor 2 is supplied to a control unit 3 via a signal line.

The control unit 3 is a device that is disposed approximately in a central portion of a vehicle (in particular, approximately in a central portion in the vehicle width direction) so as to control activation of an airbag device, a seat belt device, and the like. Specifically, the control unit 3 is an electronic control unit (ECU) that is formed of a microcomputer system and provides a signal processing function and a logical determination function. As will be described later, the control device 3 includes a main collision sensor 33 and calculates a logical product based on an output detection signal of the main collision sensor 33 and an output detection signal of the satellite sensor 2 to determine the occurrence of a collision. Further, the control device 3 may calculate a logical product based on output detection signals of a plurality of other satellite sensors (collision sensors) provided on the lateral and rear sides of the vehicle to determine the occurrence of a collision. Although the present invention does not eliminate the possibility of combinations with such configurations, further description of such combinations will not be provided because the gist of the present invention relates to processing the output signals of the satellite sensor 2 disposed in an offset position.

When it is determined that a vehicle collision has occurred, the control unit 3 supplies an activation signal to an airbag device 4 via a signal line. Moreover, the activation signal is also supplied to a seat belt device, although not illustrated in the drawing. The airbag device 4 is provided in a steering wheel device, a dash/instrument panel, or the like, and upon receiving the activation signal, operates a gas generator to deploy an airbag. By doing so, an occupant such as a driver or a passenger can be protected. Moreover, upon receiving the activation signal, the seat belt device operates a gas generator or an electric motor to quickly wind up the belt to prevent a movement of an occupant in the event of a collision.

Figure 2:
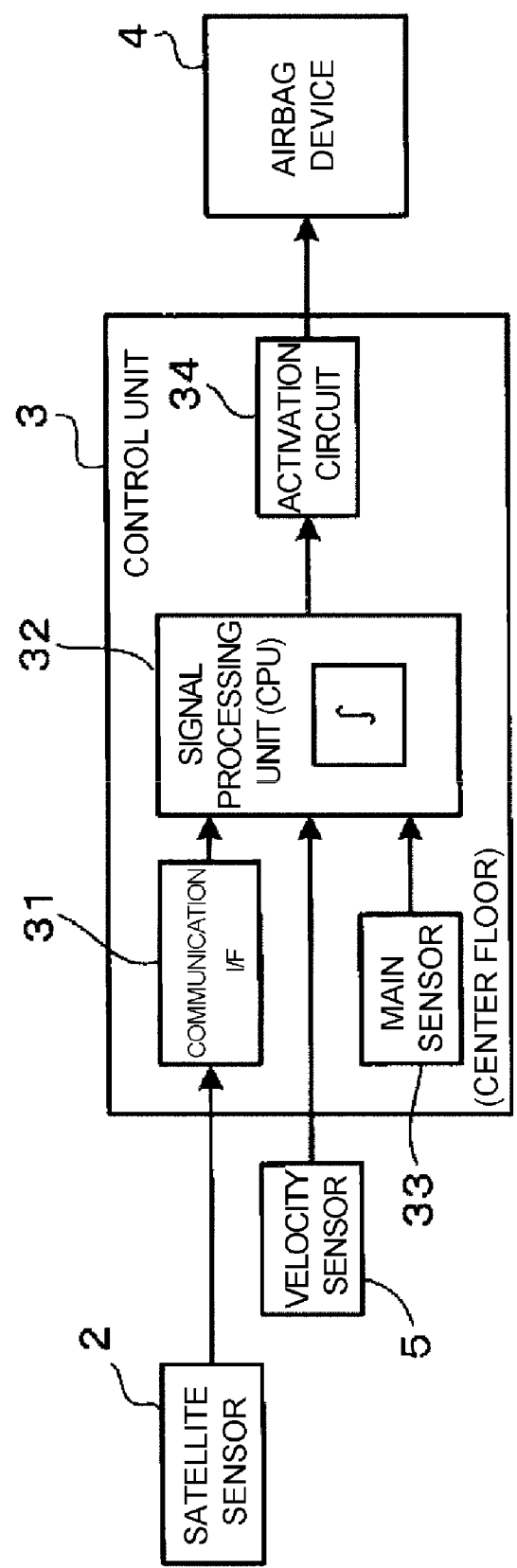
FIG. 2 is a diagram describing a control system of an embodiment.

FIG. 2 is a diagram describing the configuration of the control unit 3. The control unit 3 includes a communication interface 31 that receives the output signal of the satellite sensor 2 and converts the output signal into a digital signal, a signal processing unit 32 that has a signal processing function and a logical determination function and executes a control algorithm, a main collision sensor 33 that detects the impact of a collision using an acceleration sensor, and an activation circuit 34 that receives an activation command signal output from the signal processing unit 32 to generate an ignition signal and supplies the ignition signal to the airbag device 4 and a seat belt device (not illustrated). The communication interface 31 sends an operation command signal to a built-in timer (not illustrated) of the signal processing unit in response to the output signal of the satellite sensor 2. The built-in timer outputs a time signal $t_n$ indicating the time elapsed from the occurrence of a detection signal. In this embodiment, in order to detect a current traveling speed of the vehicle, a speed signal is supplied from a speed or velocity sensor (a speed meter) 5 mounted on the vehicle to the signal processing unit 32.

The signal processing unit (CPU) 32 makes collision determination based on the output signals of the satellite sensor 2, the collision sensor 33, the speed sensor 5 and the like. In this embodiment, since the satellite sensor 2 is disposed offset from the vehicle center position, the signal processing unit 32 executes a signal processing and determination alignment in order to obviate the occurrence of detection errors due to a change in sensitivity characteristics.

Next, how the signal processing unit 32 makes collision determination based on the output detection signal of the satellite sensor 2 will be described.

Figure 3A:
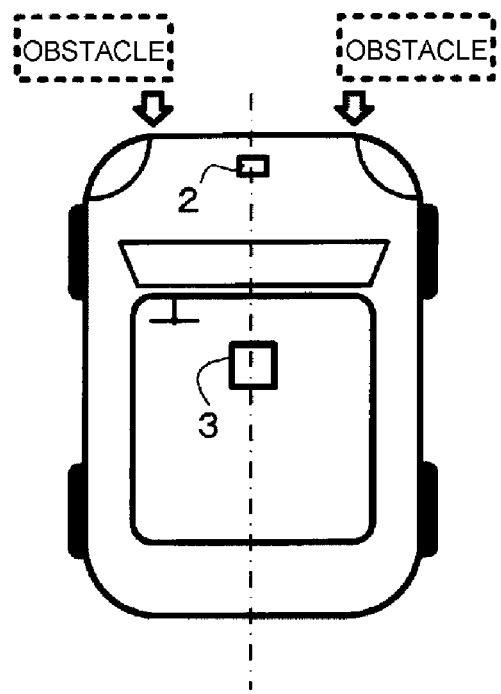
FIGS. 3A and 3B are diagrams describing problems which may occur when an offset collision is detected using a satellite sensor disposed offset from a center line.
Figure 3B:
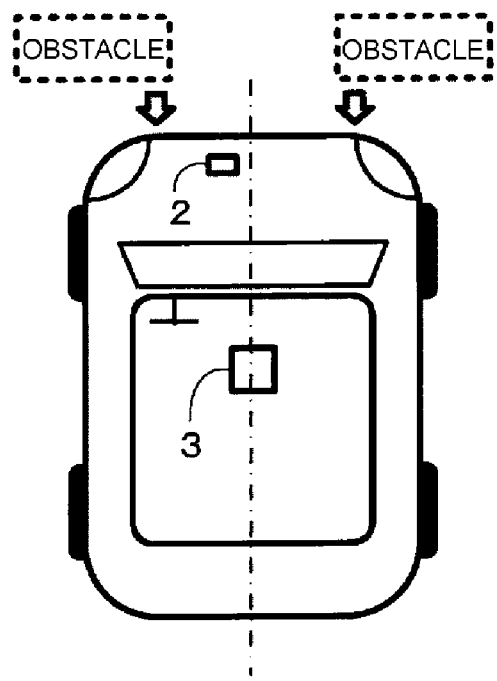

First, an example of an output detection signal of the satellite sensor 2 in the event of an offset collision will be described. FIGS. 3A and 3B are diagrams for describing aspects of an offset collision. FIG. 3A illustrates a case in which the satellite sensor 2 is disposed on the vehicle front side at the center position in the width direction. FIG. 3B illustrates a case in which the satellite sensor 2 is disposed on the vehicle front side offset to the left side from the center position in the width direction.

FIGS. 4A and 4B are diagrams for schematically describing waveforms of an output signal (an acceleration signal) of the satellite sensor (accelerometer) 2 that detects a frontal collision. FIG. 4A illustrates examples of an output signal when the satellite sensor is disposed at the center position on the vehicle front side.

As illustrated in FIG. 3A, when a vehicle collides with an obstacle on the front left side at a low speed, the satellite sensor 2 generates an output signal $L_L$. Similarly, when a vehicle collides with an obstacle on the front right side at a low speed, the satellite sensor 2 generates an output signal $L_R$. When a vehicle collides with an obstacle on the front left side at a medium speed, the satellite sensor 2 generates an output signal $M_L$. Similarly, when a vehicle collides with an obstacle on the front right side at a medium speed, the satellite sensor 2 generates an output signal $M_R$. When a vehicle collides with an obstacle on the front left side at a high speed, the satellite sensor 2 generates an output signal $H_L$. Similarly, when a vehicle collides with an obstacle on the front right side at a high speed, the satellite sensor 2 generates an output signal $H_R$. Here, the low speed is 0 to 5 km/h, the medium speed is 5 to 20 km/h, and the high speed is 20 km/h or higher, for example. However, the speed values are not limited to these specific values.

As can be understood from FIGS. 3A and 4A, when the satellite sensor 2 is disposed at the vehicle center, the satellite sensor 2 generates an output signal of the same level for the left and right offset collisions (of the same offset amount). Thus, for example, as illustrated in FIG. 4A, the level of a threshold $V_T$ can be set appropriately so that a collision with a low vehicle speed (5 km/h or lower) is not detected as a collision and the occupant protection device (for example, an airbag device) is not operated whereas the occupant protection device is operated when the vehicle speed is a medium speed or higher.

FIGS. 3B and 4B illustrate a case in which the satellite sensor 2 is disposed offset to the left side from the center position. As illustrated in FIG. 4B, when a vehicle collides with an obstacle on the front left side at a low speed, the satellite sensor 2 generates an output signal $L_L$. Similarly, when a vehicle collides with an obstacle on the front right side at a low speed, the satellite sensor 2 generates an output signal $L_R$. When a vehicle collides with an obstacle on the front left side at a medium speed, the satellite sensor 2 generates an output signal $M_L$. Similarly, when a vehicle collides with an obstacle on the front right side at a medium speed, the satellite sensor 2 generates an output signal $M_R$. When a vehicle collides with an obstacle on the front left side at a high speed, the satellite sensor 2 generates an output signal $H_L$. Similarly, when a vehicle collides with an obstacle on the front right side at a high speed, the satellite sensor 2 generates an output signal $H_R$. As illustrated in the waveforms of the output signals, when the satellite sensor 2 is disposed offset to the left side, the level of the output signal of the satellite sensor 2 increases in the event of a collision with an obstacle on the vehicle front-left side (because the satellite sensor 2 is close to the obstacle) whereas the level of the output signal of the satellite sensor 2 decreases in the event of a collision with an obstacle on the vehicle front-right side (because the satellite sensor 2 is distant from the obstacle). In this case, when such a threshold $V_T$ illustrated in FIG. 4A is used, there is a problem in that a collision is registered even when a collision with a low vehicle speed is not intended to be detected as a collision (a low-speed, left-side collision), a collision with a medium vehicle speed is not detected (a medium-speed, right-side collision), and the level of the detected acceleration signal does not correspond to the vehicle speed. Thus, it is unusual to dispose only one front satellite sensor on the vehicle front side at a position offset from the center position and use the front satellite sensor.

Figure 5:
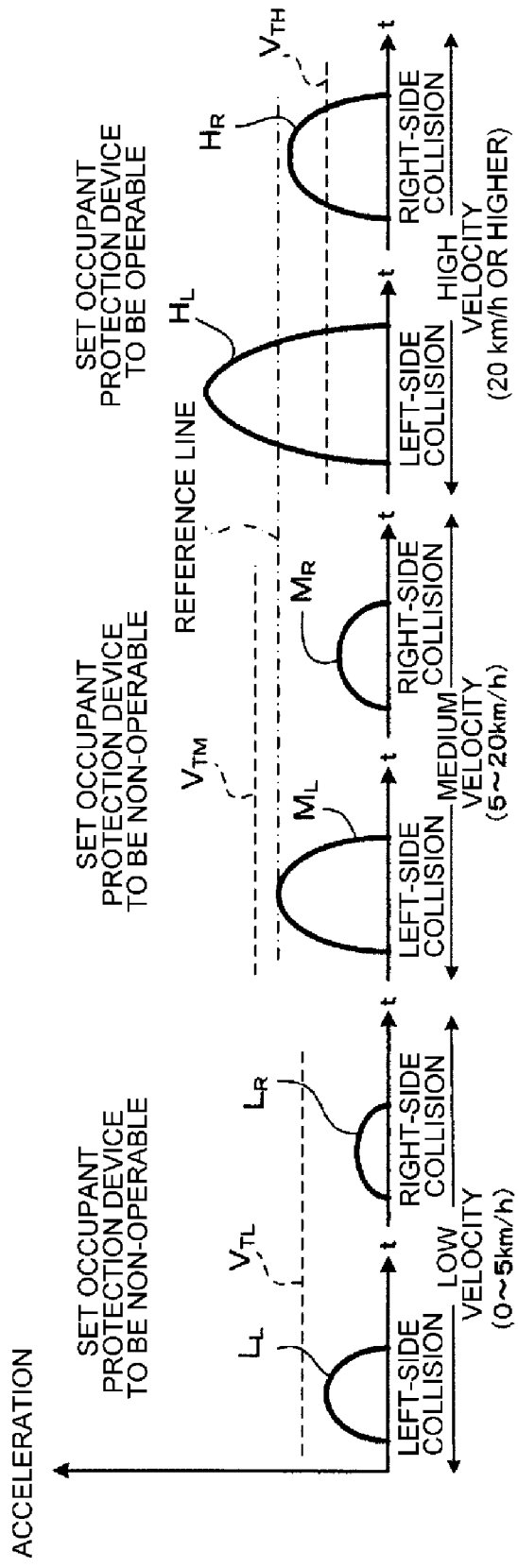
FIG. 5 is a diagram describing examples of an output signal and a set threshold when a satellite sensor disposed offset detects an offset collision.

FIG. 5 is a diagram describing the point to be noted in this embodiment. In this embodiment, one front satellite sensor 2 is disposed offset to the left side and the output signal of the front satellite sensor 2 is used in collision determination (the same can be applied when the front satellite sensor 2 is disposed offset to the right side). In this embodiment, a collision determination threshold for the output signal (acceleration) of the satellite sensor 2 is set in accordance with the traveling speed of the vehicle. As illustrated in FIG. 5, when the vehicle speed is in a low speed region (0 to 5 km/h), the threshold level for the output signal of the satellite sensor 2 is set to $V_{TL}$. When the vehicle speed is in the low speed region, since the kinetic energy of the vehicle itself is not large, the occupant protection device is controlled so as not to be operated in the event of a relatively strong acceleration (impact). However, it is not desirable to set an unnecessarily high threshold by taking a case in which an obstacle collides with the vehicle from the outside into consideration. The threshold in the low speed region is set based on such a condition. By doing so, it is possible to suppress the expensive airbag device 4 from being activated in the event of a low-speed collision. When the vehicle speed is in a medium speed region (5 to 20 km/h), the threshold level for the output signal of the satellite sensor 2 is set to $V_{TM}$. When the vehicle speed is in the medium speed region, since the vehicle is moving faster than in the low speed region, the acceleration during a frontal collision naturally increases even if the collision is not considerably severe. Even if the acceleration of the front portion during the collision is large, it is desirable to control the occupant protection device so as not to be operated (set to non-operable) in the event of a stronger acceleration (impact) than in the low speed region by taking injuries to an occupant during the collision in the medium speed region into consideration. Thus, the threshold level in the medium speed region is set to be higher than that in the low speed region. When the vehicle speed is in a high speed region (20 km/h or higher), the threshold level for the output signal of the satellite sensor 2 is set to $V_{TH}$ to detect a collision and operate the occupant protection device. When the vehicle speed is in the high speed region, the vehicle is moving faster than in the medium and low speed regions. Thus, the kinetic energy of the vehicle itself is higher than in the medium or low speed region. When the vehicle speed is in the high speed region, it is desirable to shorten the time passed until an occupant is restrained from the collision as much as possible so that the impact can be absorbed quickly by taking injuries to the occupant during the collision into consideration. Thus, the threshold level is set to be lower than in the low speed region in order to operate the occupant protection device at an early stage. The "reference line" drawn across the medium speed region and the high speed region indicates an undesirable example in which the threshold level is not set so as to correspond to the vehicle speed. The reference line indicates a threshold level set such that the occupant protection device is non-operable in the event of a left-side collision in the medium speed region. When this reference line is used in the high speed region, an airbag is not operated in the event of a right-side collision in the high speed region although it is desirable that the airbag device be operated. Thus, in this embodiment, different threshold levels are set in the low, medium, and high speed regions, for example, such that $V_{TM} > V_{TL} > V_{TH}$ (see FIG. 5).

Figure 6:
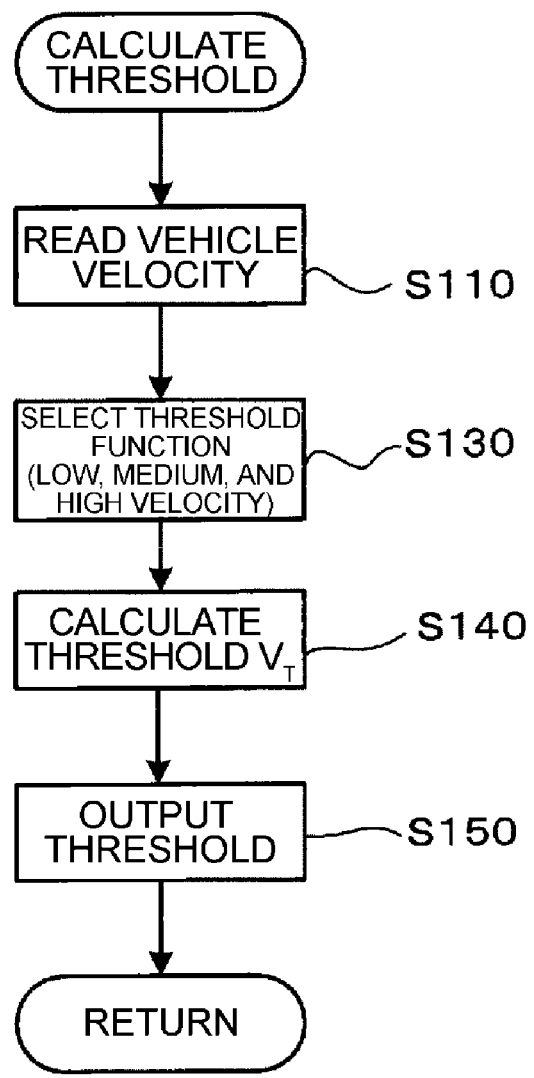
FIG. 6 is a flowchart describing an example of a set acceleration threshold corresponding to a vehicle speed.

FIG. 6 is a flowchart for describing a threshold setting process executed by the signal processing unit (CPU) 32 of the control unit 3. The CPU executes this routine periodically during traveling of a vehicle or when the satellite sensor generates an output signal (at an actual collision time). The CPU reads a speed signal transmitted from a speed sensor (speed meter) 5 of the vehicle to the signal processing unit 32 to obtain a current vehicle speed (step S110). The threshold of the front satellite sensor 2 is set based on the vehicle speed (step S130). For example, the threshold may be stored in advance as a function $V_T(V)$ of which the input is a speed value and the output is a threshold. Moreover, a threshold may be stored in advance in a memory using a vehicle speed as a parameter (for example, a storage area address). The CPU calculates a threshold corresponding to the read vehicle speed or reads the corresponding threshold from a table in the memory (step S140). The selected threshold is output to an acceleration threshold register that is included in the CPU so as to store thresholds (step S150). This threshold is used in collision determination (estimation) based on an acceleration, which will be described later. The threshold calculation (or readout) routine may be executed frequently by the CPU during traveling of the vehicle.

Figure 7:
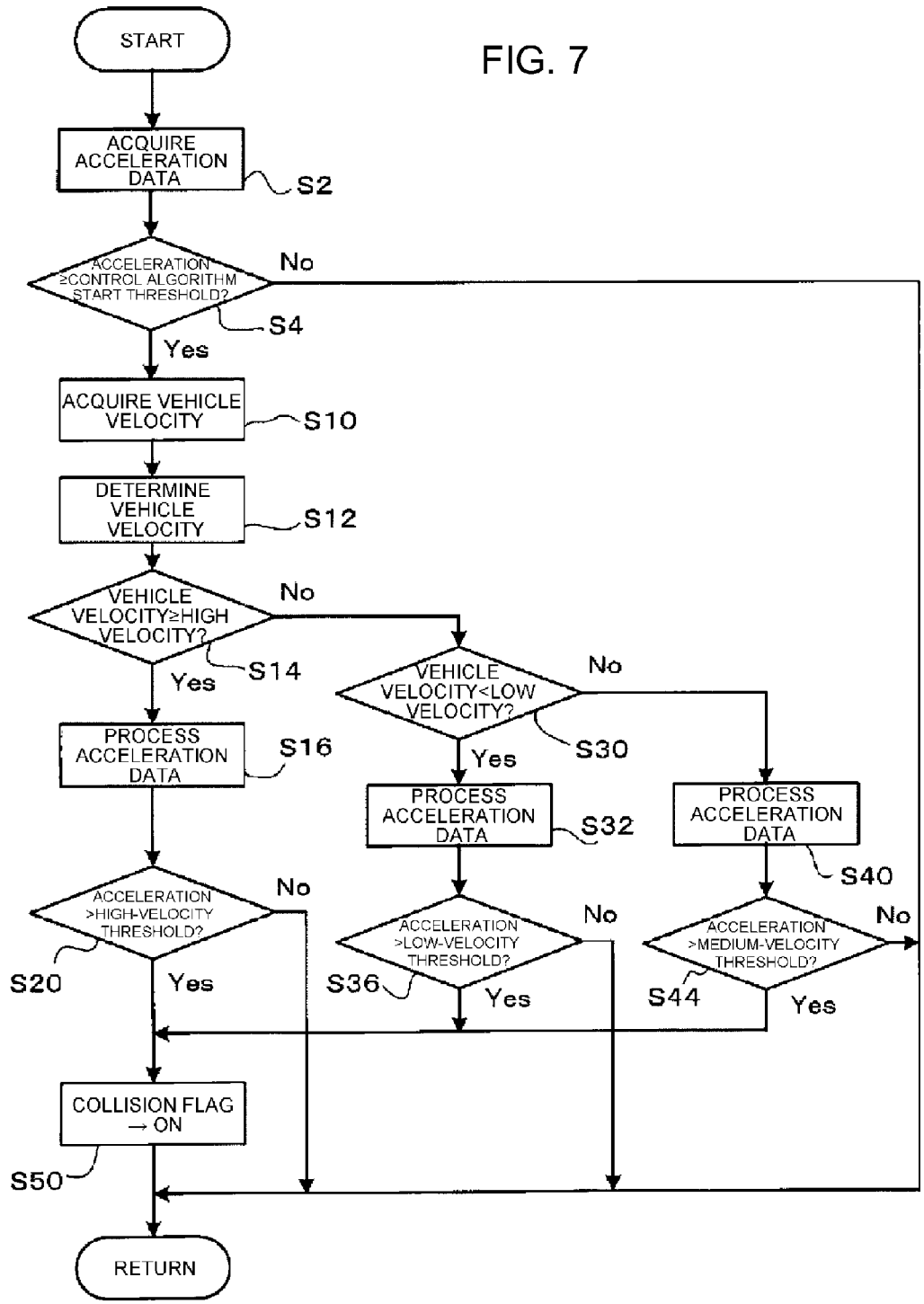
FIG. 7 is a flowchart describing an example in which an offset collision of a vehicle is detected based on an output signal of a satellite sensor disposed offset by referring to a vehicle speed.

FIG. 7 is a flowchart describing the process in which the CPU of the signal processing unit 32 determines (estimates) the occurrence of a collision based on an output signal of one satellite sensor 2 disposed offset from the vehicle center position. The CPU executes this routine when an output signal (a deceleration signal in the event of a collision) is supplied from the satellite sensor 2. First, the CPU reads the output signal (acceleration data) which is output from the satellite sensor 2 and is stored in the register (step S2) and determines whether the level of the output signal is a level at which this control algorithm is to be executed (step S4). When the level of the output signal does not exceed a threshold for executing this control algorithm (step S4: No), this routine ends.

When the level of the output signal exceeds the threshold for executing this control algorithm (step S4: Yes), the vehicle traveling speed is read from the output signal of the speed sensor 5 (step S10) and stores the vehicle speed in the register (step S12). The CPU compares the vehicle speed with the register value to determine whether the vehicle speed is a high speed, a medium speed, or a low speed (steps S14, S30, and S40).

When it is determined that the vehicle speed is a high speed (step S14: Yes), the CPU performs a filtering process on the acceleration data of the output signal of the satellite sensor 2 input to the register as necessary (step S16). The CPU compares the acceleration with a threshold $V_{TH}$ corresponding to the high speed stored in the register (step S20). When the acceleration (deceleration) level does not exceed the threshold (step S20: No), the CPU determines that a collision has not occurred and end the process.

When it is determined that the vehicle speed is a low speed (step S14: No, S30: Yes), the CPU performs a filtering process on the acceleration data of the output signal of the satellite sensor 2 input to the register as necessary (step S32). The CPU compares the acceleration with a threshold $V_{TL}$ corresponding to the low speed stored in the register (step S36). When the acceleration (deceleration) level does not exceed the threshold (step S36: No), the CPU determines that a collision has not occurred and ends the process.

When it is determined that the vehicle speed is a medium speed (step S14: No, S30: No), the CPU performs a filtering process on the acceleration data of the output signal of the satellite sensor 2 input to the register as necessary (step S40). The CPU compares the acceleration with a threshold $V_{TM}$ corresponding to the medium speed stored in the register (step S44). When the acceleration (deceleration) level does not exceed the threshold (step S44: No), the CPU determines that a collision has not occurred and end the process.

On the other hand, when the vehicle speed is a high speed and the acceleration (deceleration) which is the output signal of the satellite sensor 2 exceeds the threshold $V_{TH}$ (step S20: Yes), when the vehicle speed is a medium speed and the activation (deceleration) exceeds the threshold $V_{TM}$ (step S44: Yes), or when the vehicle speed is a low speed and the acceleration (deceleration) exceeds the threshold $V_{TL}$ (step S36: Yes), the CPU sets a collision flag (collision signal) of the flag register to ON (step S50). When the collision flag is set to ON, an activation command signal is transmitted to the activation circuit 34 and an ignition signal is sent to the occupant protection device 4.

The CPU executes steps S10 to S50 repeatedly at a predetermined cycle (for example, every 0.001 seconds) to monitor the output signal (instantaneous value) of the satellite sensor 2 and determines the occurrence of a collision.

(Second Embodiment)

A second embodiment of the present invention will be described. In the second embodiment, the signal processing unit 32 integrates the output signal (acceleration signal) of the front satellite sensor to obtain a speed signal. Collision determination is made based on the speed signal (integrated value). The present inventor has found that, even when the satellite sensor 2 is disposed offset from the vehicle center position in the vehicle width direction, collision determination can be made by obtaining a speed signal from the output signal of the satellite sensor 2 and setting the level of a collision determination threshold so as to correspond to the vehicle speed and the time elapsed from the rising-edge time point of the output signal (or changing the threshold level in accordance with the elapsed time).

Figure 8:
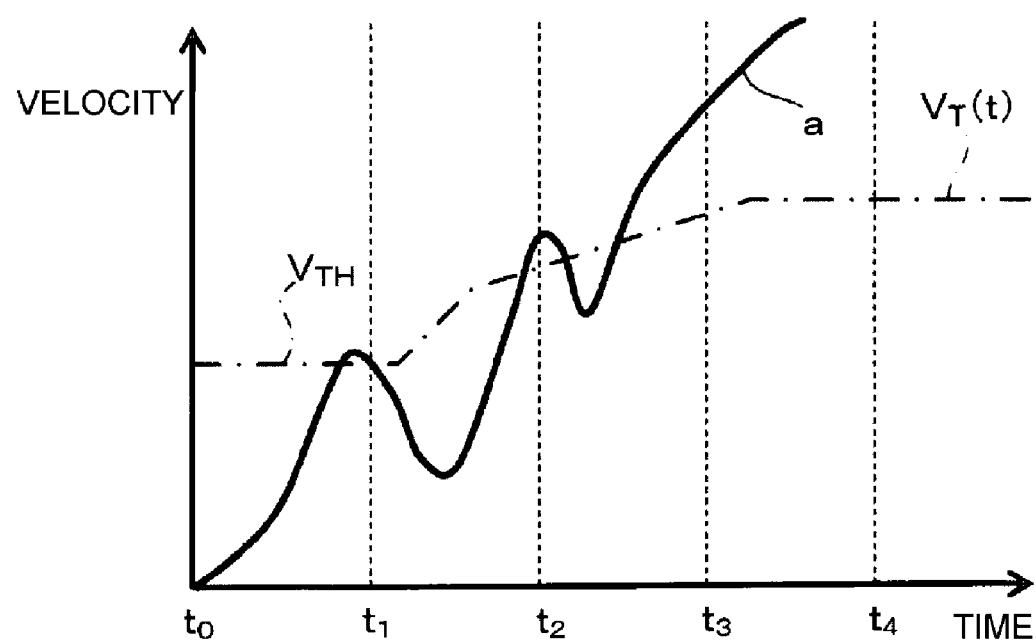
FIG. 8 is a graph describing an example (a case of a high vehicle speed and a front-right side collision) of an integrated signal of an output signal of a satellite sensor disposed closer to the left side than the center line.
Figure 9:
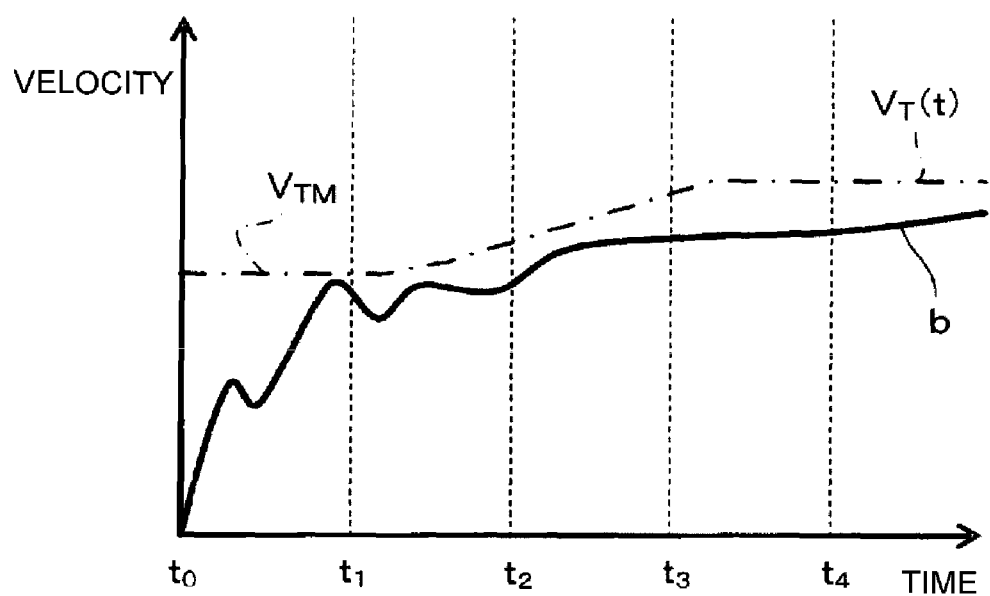
FIG. 9 is a graph describing an example (a case of a medium vehicle speed and a front-left side collision) of an integrated signal of an output signal of a satellite sensor disposed closer to the left side than the center line.
Figure 10:
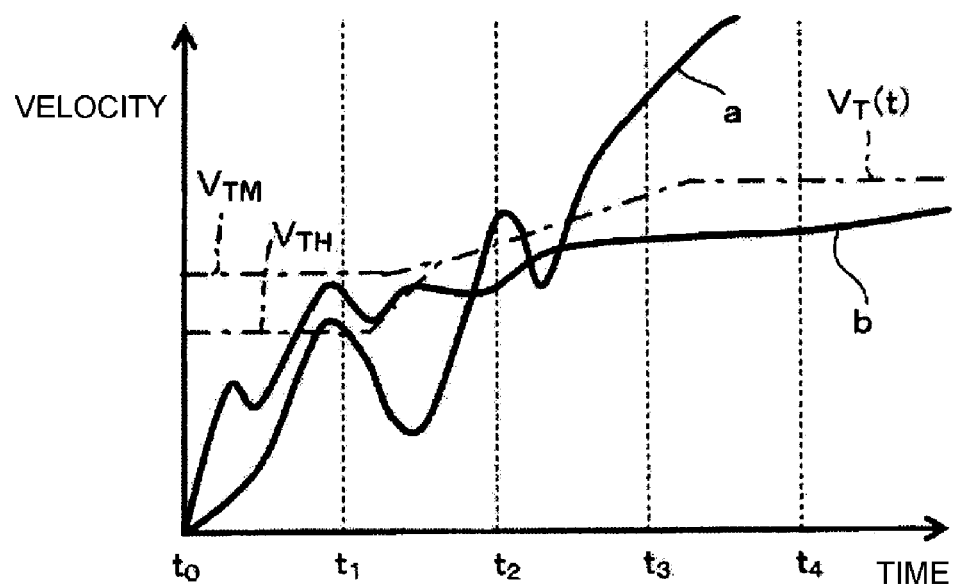
FIG. 10 is a graph comparing output signals and thresholds of FIGS. 8 and 9.

FIGS. 8 to 10 are diagrams for describing how a collision can be detected using a threshold which is set for an integrated value of the output signal of the satellite sensor 2 disposed offset from the center position. FIG. 10 is a diagram in which the graphs of FIGS. 8 and 9 are superimposed.

In FIGS. 8 and 10, a curve "a" illustrates an example of a speed signal (an integrated value of the output signal of the satellite sensor 2) when a right-side offset collision occurs and a vehicle is travelling in the high speed region (for example, 60 km/h) (see FIG. 4B). Moreover, a curve $V_T(t)$ in the drawings illustrates a threshold function of which the value changes with the time "t" elapsed from detection of a signal by the satellite sensor 2. The example of FIG. 8 corresponds to a deployment mode in which it is desirable to deploy an occupant protection device (for example, an airbag because the vehicle is in the high speed) quickly.

In FIGS. 9 and 10, a curve "b" illustrates an example of a speed signal (an integrated value of the output signal of the satellite sensor 2) when a left-side offset collision occurs and the vehicle speed is in the medium speed region (for example, 10 km/h). This example corresponds to a non-deployment mode in which it is desirable that the occupant protection device (for example, the airbag device 4) is not to be deployed.

In general, as illustrated in FIG. 10, when only one threshold function (that is, the threshold is not changed in accordance with the vehicle traveling speed) is used, it is difficult to identify a difference in the level of the speed signal "a" and the speed signal "b" no later than the time point "$t_2$" on the time axis. However, when a vehicle is travelling at a high speed, it is desirable to move up the time point at which it is determined whether or not to deploy an airbag or wind up the seat belt to operate the occupant protection device so that a sufficient restraining force is applied to an occupant. Due to this, it is necessary to make collision determination near the time "$t_1$" on the time axis.

Thus, in this embodiment, the value of the threshold function $V_T(t)$ is changed according to the vehicle traveling speed "v". That is, a threshold function $V_T(t,v)$ is used as the threshold function $V_T(t)$ to distinguish between two collision modes which are difficult to determine.

For example, in the example of FIG. 8, the vehicle is travelling at a high speed (for example, 60 km/h) and a threshold function $V_T(t)$ for the high speed (or the low and high speed) is set as a collision detection threshold. The value of the threshold function $V_T(t)$ is set to a low threshold speed $V_{TH}$ in the period between the starting point $t_0$ and the point near $t_1$ on the time axis. As a result, it is possible to detect a high-speed offset collision at the position near $t_1$ on the time axis based on the curve "b" and the threshold $V_{TH}$.

In FIG. 9, the vehicle is travelling at a medium speed (for example, 10 km/h) and a threshold value $V_T(t)$ for the medium speed is set as a collision detection threshold. This threshold $V_T$ pattern is set to a threshold speed $V_{TM}$ higher than $V_{TH}$ in the period between the starting point and the point near $t_2$ on the time axis. As a result, the curve "a" does not cross the threshold $V_{TM}$ and it is determined that a collision has not occurred. Due to this, it is possible to obviate the unnecessary activation of the airbag device 4, the pretensioner of the seat belt device at a low speed.

(Reference Example)

Figure 11:
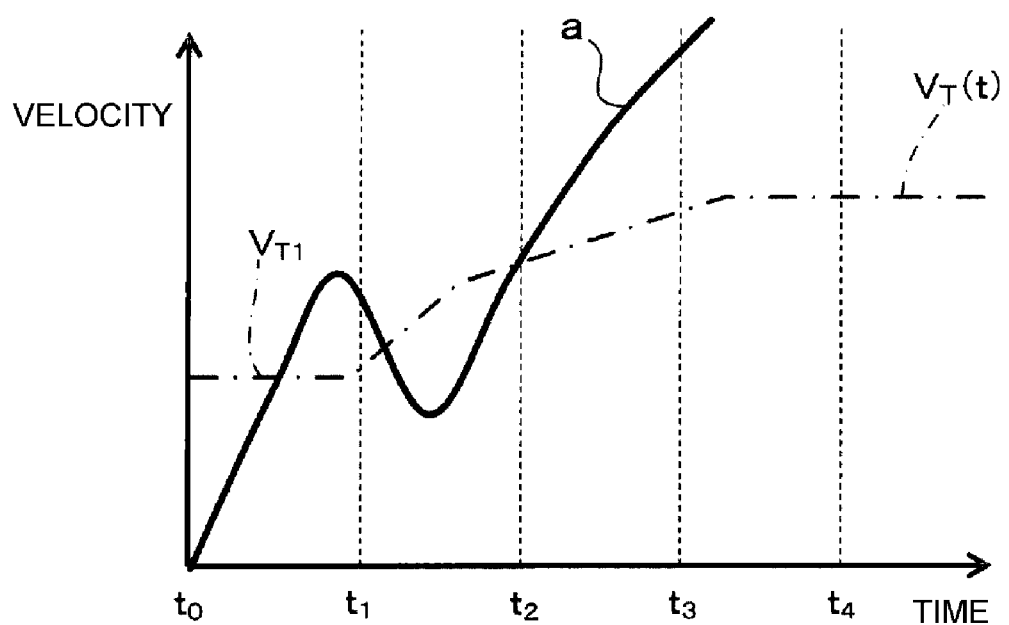
FIG. 11 is a graph describing an example (a case of a high vehicle speed and a front-right side collision) of an integrated signal of an output signal of a satellite sensor of a Reference Example.
Figure 12:
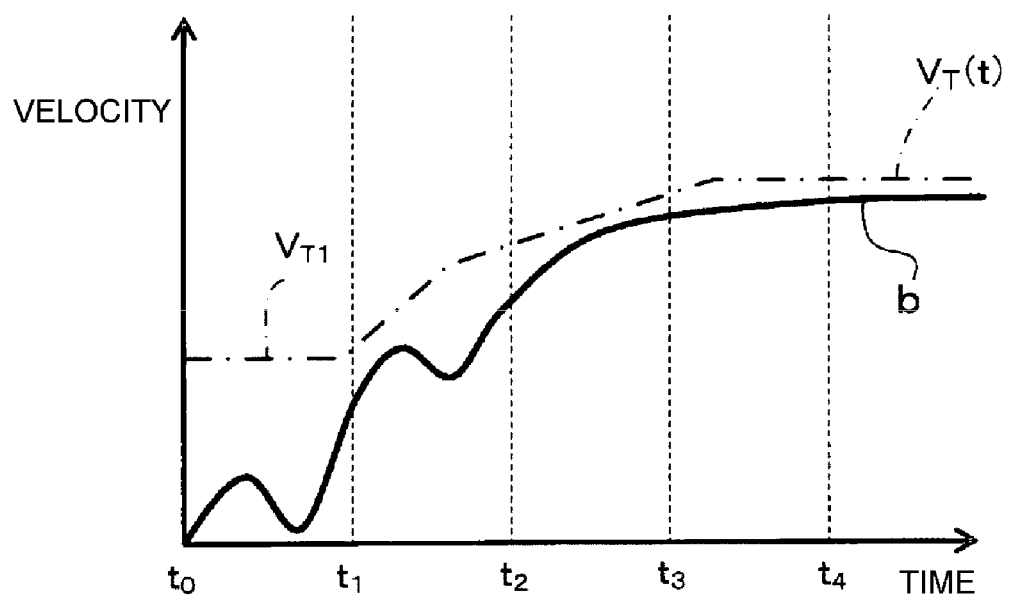
FIG. 12 is a graph describing an example (a case of a medium vehicle speed and a front-left side collision) of an integrated signal of an output signal of a satellite sensor of a Reference Example.
Figure 13:
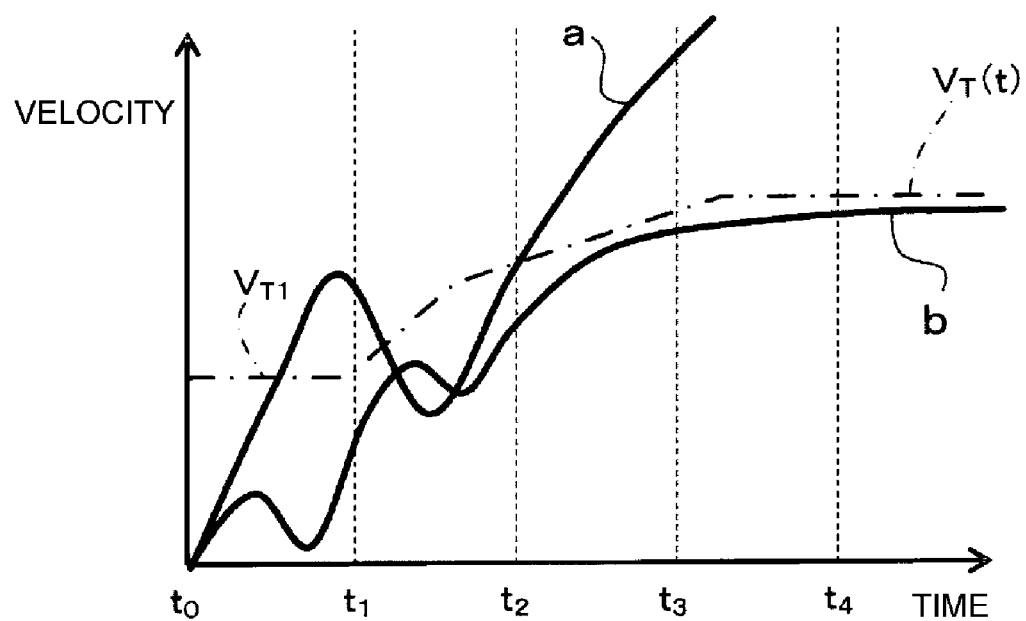
FIG. 13 is a graph comparing output signals and thresholds of FIGS. 11 and 12.

FIGS. 11 to 13 illustrate examples of speed signals (an integrated signals) "a" and "b" of the output signal of one satellite sensor when two satellite sensors are disposed bilaterally symmetrical about the vehicle center line. In this example, as illustrated in FIG. 5, a threshold vehicle speed for determining whether or not to operate the occupant protection device 4 is set between the medium speed and the high speed. Due to this, whether a signal waveform of a left-side collision with a medium vehicle speed can be distinguished from a signal waveform of a right-side collision with a high vehicle speed is one of discriminating elements. Thus, how the signals "a" and "b" of the two cases are distinguished will be described.

In the example of FIG. 11, the vehicle is travelling at a high speed (for example, 60 km/h) and a threshold function $V_T(t)$ for the high speed is set as a collision determination threshold. It is necessary to operate the occupant protection device in the event of a high-speed vehicle collision. The value of the threshold function $V_T(t)$ is set to a low threshold speed $V_{T1}$ in the period between the starting point $t_0$ and the point near $t_1$ on the time axis. As a result, it is possible to detect a high-speed offset collision at the position near $t_1$ on the time axis based on the curve "a" and the threshold $V_{T1}$.

In the case of FIG. 12, the vehicle is travelling at a medium speed (for example, 10 km/h) and a threshold function $V_T(t)$ for the medium speed is set as a collision detection threshold. This threshold $V_T$ pattern is set to a threshold speed $V_{T1}$ in the period between the starting point $t_0$ and the point near $t_1$ on the time axis. As a result, the speed curve "b" does not cross the threshold $V_T(t)$, and it is determined that a collision has not occurred. Due to this, it is possible to obviate the unnecessary activation of the airbag device 4 or the pretensioner of the seat belt device at a low speed.

FIG. 13 is a diagram in which the graphs of FIGS. 11 and 12 are superimposed. In this example (collision determination is made based on the speed signal (integrated signal) of the output signal of one satellite sensor when two satellite sensors are disposed bilaterally symmetrical about the vehicle center line), it is possible to determine whether or not to operate the occupant protection device in the event of a vehicle offset collision in the period between the starting point $t_0$ and the point $t_1$ on the time axis using the same threshold function $V_T(t)$.

Thus, it is possible to make determination using the same threshold for all vehicle velocities.

(Second Embodiment)

Figure 14:
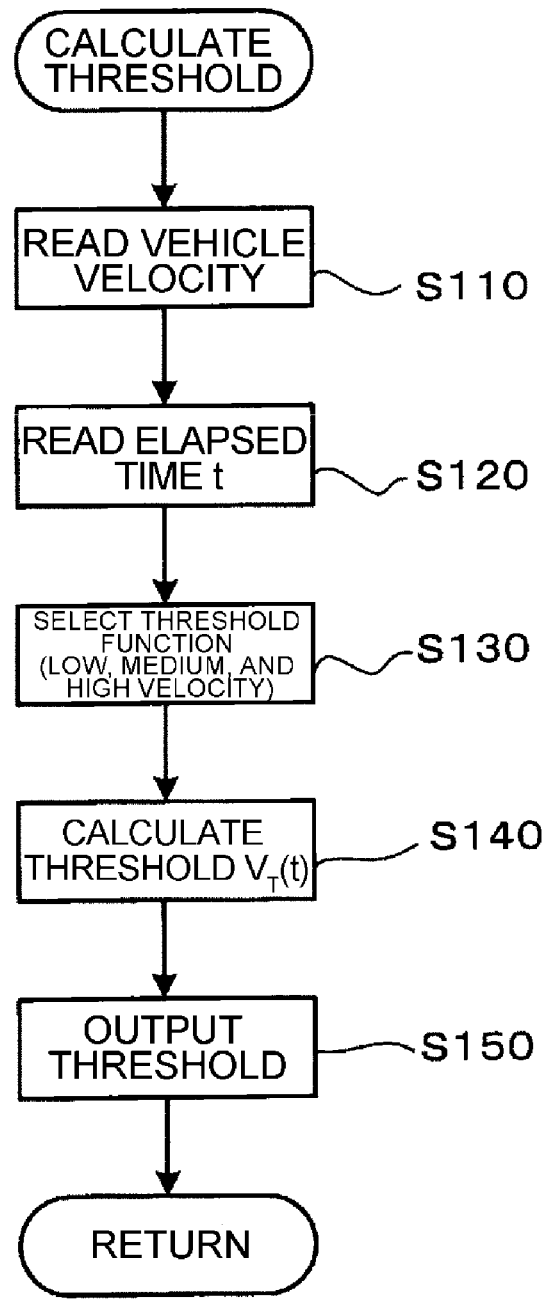
FIG. 14 is a flowchart describing an example of a set speed threshold corresponding to a vehicle speed.
Figure 15:
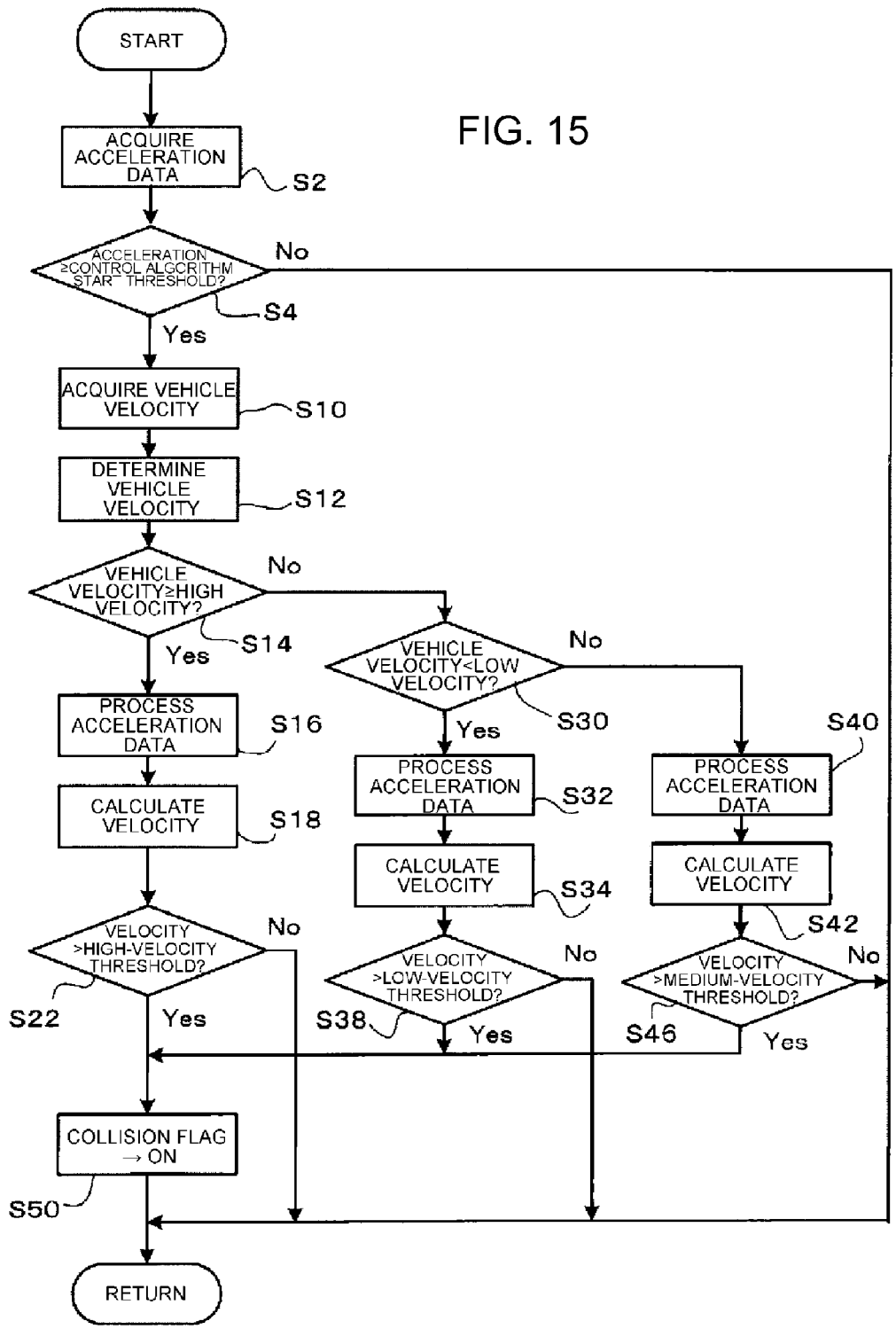
FIG. 15 is a flowchart describing an example in which an offset collision of a vehicle is detected based on an integrated value of an output signal of a satellite sensor disposed offset by referring to a vehicle speed.

FIGS. 14 and 15 are flowcharts of a second embodiment, for describing the operation of a control system when collision determination is made based on an integrated value (a speed signal) of an output signal (an acceleration signal or a deceleration signal) of the satellite sensor 2. In the second embodiment, the threshold $V_T(t)$ can be changed with the elapsed time. Moreover, the threshold function $V_T(t)$ is selected according to the vehicle speed.

FIG. 14 is a flowchart describing a threshold setting process executed by the signal processing unit (CPU) 32 of the control unit 3, in which the portions corresponding to those of FIG. 6 are denoted by the same reference numerals.

The CPU executes this routine periodically during traveling of a vehicle or when the satellite sensor 2 generates an output signal (at an actual collision time). The CPU reads a speed signal transmitted from a speed sensor (speed meter) of the vehicle to the signal processing unit 32 to obtain a current vehicle speed (step S110). Moreover, the time $t_n$ elapsed from the supply (rising-edge) time $t_0$ of the output signal of the satellite sensor 2 is read from the output signal of the built-in timer described above (step S120).

The CPU selects a corresponding threshold function among a plurality of functions $V_T(t)$ (see FIGS. 8 to 10) stored in advance in the memory based on the vehicle speed. Alternatively, the CPU creates a threshold function expression (for example, broken-line characteristics) (step S130). A function $V_T(t_n)$ of which the output is a threshold may be stored in advance. Moreover, a threshold may be stored in advance in a storage area of the memory using the vehicle speed and the elapsed time as parameters (for example, storage area addresses). The CPU calculates a threshold corresponding to the read vehicle speed or reads the corresponding threshold from a table in the memory (step S140).

The CPU outputs the selected threshold to a speed threshold register that is included in the CPU so as to store thresholds (step S150). This threshold is used in collision determination (estimation) based on the speed signal, which will be described later. The threshold calculation (or readout) routine may be executed frequently by the CPU during traveling of the vehicle. The CPU executes steps S110 to S150 repeatedly to generate a threshold $V_T(t_n)$ corresponding to the elapsed time.

FIG. 15 is a flowchart describing an example in which a collision is determined based on an integrated value (a speed signal) of the output signal of the satellite sensor. In the drawing, the portions corresponding to those of FIG. 7 are denoted by the same reference numerals.

FIG. 15 is a flowchart describing the process in which the CPU of the signal processing unit 32 determines (estimates) a collision based on the output signal of one satellite sensor 2 disposed to be offset from the vehicle center position. In this embodiment, collision determination is made based on the integrated value (the speed signal) of the output signal of the satellite sensor 2.

The CPU executes this routine when an output signal (a deceleration signal in the event of a collision) is supplied from the satellite sensor 2. First, the CPU reads the output signal (acceleration data) which is output from the satellite sensor 2 and is stored in the register (step S2) and determines whether the level of the output signal is a level at which this control algorithm is to be executed (step S4). When the level of the output signal does not exceed a threshold for executing this control algorithm (step S4: No), this routine ends.

When the level of the output signal exceeds the threshold for executing this control algorithm (step S4: Yes), the vehicle traveling speed is read from the output signal of the speed sensor 5 (step S10) and stores the vehicle speed in the register (step S12). The CPU compares the vehicle speed with the register value to determine whether the vehicle speed is a high speed, a medium speed, or a low speed (steps S14, S30, and S40).

When it is determined that the vehicle speed is a high speed (step S14: Yes), the CPU performs signal processing such as a filtering process on the acceleration data (an instantaneous value of the acceleration signal) of the output signal of the satellite sensor 2 input to the register as necessary (step S16). The CPU integrates the acceleration signal to output a speed signal (step S18). The CPU compares the speed signal level with a threshold $V_{TH}(t_n)$ corresponding to the high speed stored in the threshold register (step S22). When the speed signal level does not exceed the threshold (step S22: No), the CPU determines that a collision has not occurred and end the process.

When it is determined that the vehicle speed is a low speed (step S14: No, S30: Yes), the CPU performs signal processing such as a filtering process on the acceleration data of the output signal of the satellite sensor 2 input to the register as necessary (step S32). The CPU integrates the acceleration signal to output a speed signal (step S34). The CPU compares the speed signal level with a threshold $V_{TL}(t_n)$ corresponding to the low speed stored in the register (step S38). When the speed signal level does not exceed the threshold (step S38: No), the CPU determines that a collision has not occurred and ends the process.

When it is determined that the vehicle speed is a medium speed (step S14: No, S30: No), the CPU performs signal processing such as a filtering process on the acceleration data of the output signal of the satellite sensor 2 input to the register as necessary (step S40). The CPU integrates the acceleration signal to output a speed signal (step S42). The CPU compares the speed signal level with a threshold $V_{TM}(t_n)$ corresponding to the medium speed stored in the threshold register (step S46). When the speed signal level does not exceed the threshold (step S46: No), the CPU determines that a collision has not occurred and end the process.

On the other hand, when the vehicle speed is a high speed and the level of the speed signal which is the integrated value of the output signal of the satellite sensor 2 exceeds the threshold $V_{TH}$ (step S22: Yes), when the vehicle speed is a medium speed and the speed signal level exceeds the threshold $V_{TM}$ (step S46: Yes), or when the vehicle speed is a low speed and the speed signal level exceeds the threshold $V_{TL}$ (step S38: Yes), the CPU sets a collision flag (collision signal) of the flag register to ON (step S50). When the collision flag is set to ON, an activation command signal is transmitted to the activation circuit 34 and an ignition signal is sent to the occupant protection device 4.

The CPU executes steps S10 to S50 repeatedly at a predetermined cycle (for example, every 0.001 seconds) to monitor the output signal (instantaneous value) of the satellite sensor 2 and determines the occurrence of a collision.

(Third Embodiment)

Figure 16:
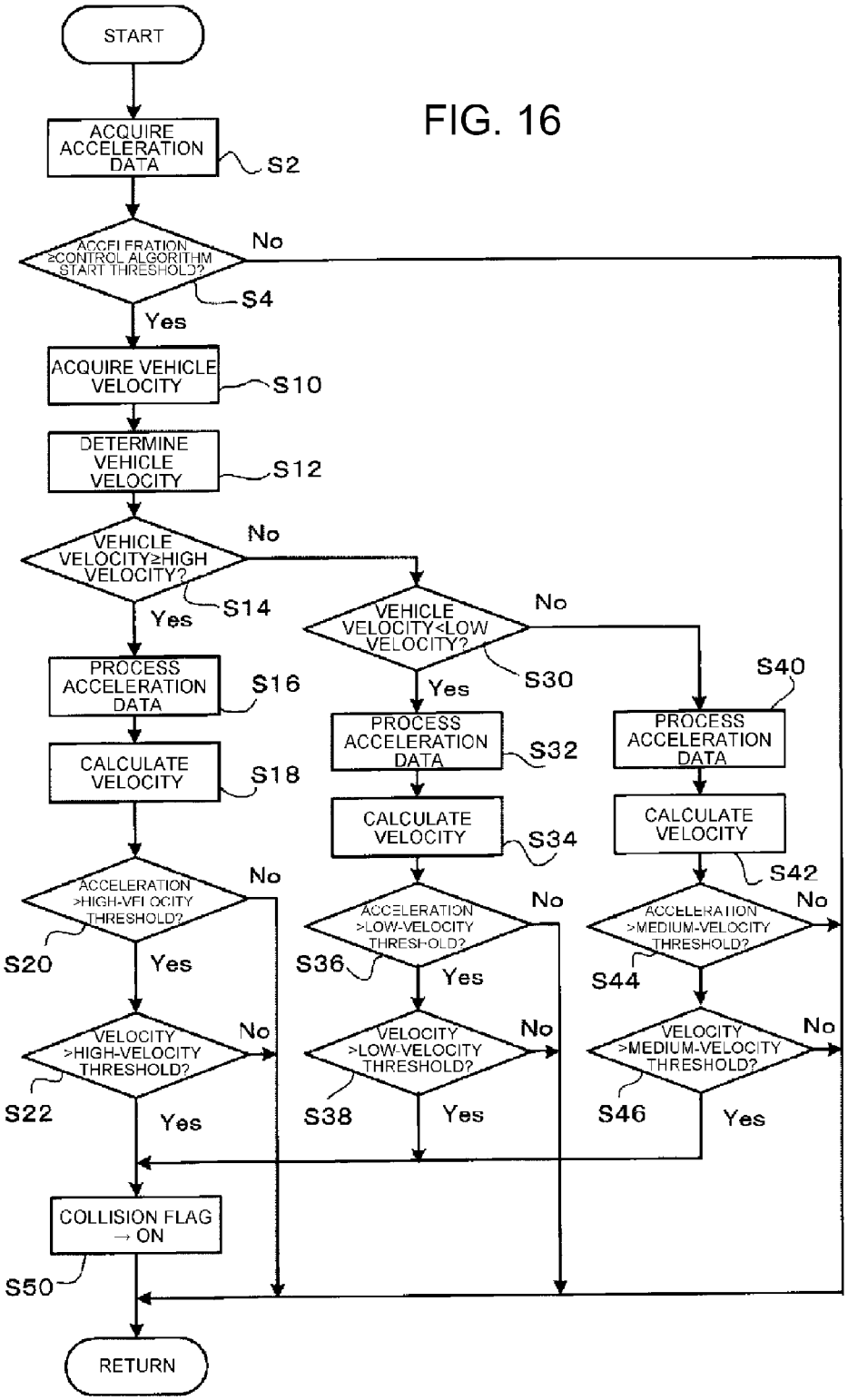
FIG. 16 is a flowchart describing an example in which an offset collision of a vehicle is detected based on an output signal of a satellite sensor disposed offset and an integrated value thereof by referring to a vehicle speed.

FIG. 16 illustrates a third embodiment of the present invention. In the drawing, the portions corresponding to those of FIGS. 7 and 15 are denoted by the same reference numerals.

FIG. 16 is a flowchart describing the process in which the CPU of the signal processing unit 32 determines (estimates) a collision based on the output signal of one satellite sensor 2 disposed to be offset from the vehicle center position. In this embodiment, collision determination is made based on two signals, the output signal of the satellite sensor 2 and the integrated value (the speed signal) thereof.

The CPU executes this routine when an output signal (a deceleration signal in the event of a collision) is supplied from the satellite sensor 2. First, the CPU reads the output signal (acceleration data) which is output from the satellite sensor 2 and is stored in the register (step S2) and determines whether the level of the output signal is a level at which this control algorithm is to be executed (step S4). When the level of the output signal does not exceed a threshold for executing this control algorithm (step S4: No), this routine ends.

When the level of the output signal exceeds the threshold for executing this control algorithm (step S4: Yes), the vehicle traveling speed is read from the output signal of the speed sensor 5 (step S10) and stores the vehicle speed in the register (step S12). The CPU compares the vehicle speed with the register value to determine whether the vehicle speed is a high speed, a medium speed, or a low speed (steps S14, S30, and S40).

When it is determined that the vehicle speed is a high speed (step S14: Yes), the CPU performs signal processing such as a filtering process on the acceleration data (an instantaneous value of the acceleration signal) of the output signal of the satellite sensor 2 input to the register as necessary (step S16). The CPU integrates the acceleration signal to output a speed signal (step S18).

The CPU compares the acceleration with a threshold $V_{TH}$ corresponding to the high speed stored in the threshold register (step S20). When the acceleration (deceleration) level does not exceed the threshold stored in the acceleration threshold register (step S20: No), the CPU determines that a collision has not occurred and ends the process.

When the acceleration (deceleration) level exceeds the threshold (step S20: Yes), the CPU further compares the speed signal level with a threshold $V_{TH}(t_n)$ corresponding to the high speed stored in the speed threshold register (step S22). When the speed signal level does not exceed the threshold (step S22: No), the CPU determines that a collision has not occurred and ends the process.

When it is determined that the vehicle speed is a low speed (step S14: No, S30: Yes), the CPU performs signal processing such as a filtering process on the acceleration data of the output signal of the satellite sensor 2 input to the register as necessary (step S32). The CPU integrates the acceleration signal to output a speed signal (step S34).

The CPU compares the acceleration with a threshold $V_{TL}$ corresponding to the low speed stored in the acceleration threshold register (step S36). When the vehicle speed is a low speed and the acceleration (deceleration) does not exceed the threshold $V_{TL}$ (step S36: No), the CPU determines that a collision has not occurred and ends the process.

When the acceleration (deceleration) exceeds the threshold $V_{TL}$ (step S36: Yes), the CPU further compares the speed signal level with a threshold $V_{TL}(t_n)$ corresponding to the low speed stored in the speed threshold register (step S38). When the speed signal level does not exceed the threshold (step S38: No), the CPU determines that a collision has not occurred and ends the process.

When it is determined that the vehicle speed is a medium speed (step S14: No, S30: No), the CPU performs signal processing such as a filtering process on the acceleration data of the output signal of the satellite sensor 2 input to the register as necessary (step S40). The CPU integrates the acceleration signal to output a speed signal (step S42). The CPU compares the acceleration with a threshold $V_{TM}$ corresponding to the medium speed stored in the acceleration threshold register (step S44). When the acceleration (deceleration) level does not exceed the threshold (step S44: No), the CPU determines that a collision has not occurred and ends the process.

The CPU compares the speed signal level with a threshold $V_{TM}(t_n)$ corresponding to the medium speed stored in the threshold register (step S46). When the speed signal level does not exceed the threshold (step S46: No), the CPU determines that a collision has not occurred and ends the process.

On the other hand, when the vehicle speed is a high speed and the output signal (acceleration signal) level of the satellite sensor 2 and the level of the speed signal which is the integrated value of the output signal exceed the threshold $V_{TH}$ (step S22: Yes), when the vehicle speed is a medium speed and the speed signal level exceeds the threshold $V_{TM}$ (step S46: Yes), or when the vehicle speed is a low speed and the speed signal level exceeds the threshold $V_{TL}$ (step S38: Yes), the CPU sets a collision flag (collision signal) of the flag register to ON (step S50). When the collision flag is set to ON, an activation command signal is transmitted to the activation circuit 34 and an ignition signal is sent to the occupant protection device 4.

The CPU executes steps S10 to S50 repeatedly at a predetermined cycle (for example, every 0.001 seconds) to monitor the output signal (instantaneous value) of the satellite sensor 2 and determines the occurrence of a collision.

When it is determined in step S20 that a collision has occurred, the collision detection flag may be set to ON based on the acceleration and step S22 may be executed without executing further determination in step S20. By doing so, it can be determined that a collision has occurred when the collision detection flag is set to ON based on the acceleration and the collision detection flag is set to ON based on the speed (step S22). The same can be applied to steps S36 and S44. A collision can be detected more reliably when the collision detection based on the acceleration signal and the collision detection based on the speed signal are made at different time points.

Moreover, the order of executing the collision detection (step S20) based on the acceleration signal and the collision detection (step S22) based on the speed signal may be reversed.

(Fourth Embodiment)

In a fourth embodiment, the collision determination based on the acceleration signal illustrated in FIG. 7 and the collision determination based on the speed signal illustrated in FIG. 15 are executed simultaneously by a multiprocessor. When all collision flags (based on the acceleration signal and the speed signal) are set to ON in the respective determination processes (when AND condition is satisfied), it is determined that a vehicle collision has occurred.

As described above, according to the embodiments of the present invention, it is advantageous in that the left and right offset collisions can be detected based on the output signal of one satellite sensor disposed on the vehicle front side offset from the center position.

The signal processing device 32 may include the main collision sensor 33 (for example, on the same circuit board), and the collision detection based on the output signal of the main collision sensor 33 is performed simultaneously. In order to prevent operation errors and detection errors, the signal processing device 32 can operate the activation circuit 34 when both the collision flag based on the collision determination based on the output signal of the satellite sensor 2 and the collision flag based on the collision determination based on the output signal of the main collision sensor 33 are set to ON (when AND condition is satisfied). Moreover, a collision can be determined based on the output signals of a plurality of satellite sensors including the front satellite sensor 2.

In the embodiments of the present invention, although the control device of the present invention is applied to a front satellite sensor, the control device may be also applied to other satellite sensors and the main sensor in the electronic control device.

FIG. 1
VEHICLE FRONT SIDE
CENTER LINE
LEFT SIDE
RIGHT SIDE
4 AIRBAG DEVICE
3 CONTROL UNIT
VEHICLE
VEHICLE REAR SIDE

FIG. 2
2 SATELLITE SENSOR
5 SPEED SENSOR
31 COMMUNICATION I/F
32 SIGNAL PROCESSING UNIT
3 CONTROL UNIT
34 ACTIVATION CIRCUIT
33 MAIN SENSOR
CENTER FLOOR
4 AIRBAG DEVICE
FIG. 3A
OBSTACLE
OBSTACLE
FIG. 3B
OBSTACLE
OBSTACLE
FIG. 4A
SATELLITE SENSOR IS DISPOSED AT CENTER LINE
ACCELERATION
LOW SPEED
MEDIUM SPEED
HIGH SPEED
LEFT-SIDE COLLISION
RIGHT-SIDE COLLISION
LEFT-SIDE COLLISION
RIGHT-SIDE COLLISION
LEFT-SIDE COLLISION
RIGHT-SIDE COLLISION
FIG. 4B
SATELLITE SENSOR IS OFFSET TO LEFT SIDE
ACCELERATION
LOW SPEED
MEDIUM SPEED
HIGH SPEED
LEFT-SIDE COLLISION
RIGHT-SIDE COLLISION
LEFT-SIDE COLLISION
RIGHT-SIDE COLLISION
LEFT-SIDE COLLISION
RIGHT-SIDE COLLISION
FIG. 5
EXAMPLE OF SETTING THRESHOLD WHEN SATELLITE SENSOR IS OFFSET TO LEFT SIDE
ACCELERATION
LOW SPEED
MEDIUM SPEED
HIGH SPEED (20 km/h OR HIGHER)
SET OCCUPANT PROTECTION DEVICE TO BE NON-OPERABLE
SET OCCUPANT PROTECTION DEVICE TO BE NON-OPERABLE
SET OCCUPANT PROTECTION DEVICE TO BE OPERABLE
REFERENCE LINE
LEFT-SIDE COLLISION
RIGHT-SIDE COLLISION
LEFT-SIDE COLLISION
RIGHT-SIDE COLLISION
LEFT-SIDE COLLISION
RIGHT-SIDE COLLISION
FIG. 6
CALCULATE THRESHOLD
S110 READ VEHICLE SPEED
S130 SELECT THRESHOLD FUNCTION (LOW, MEDIUM, AND HIGH SPEED)
S140 CALCULATE THRESHOLD $V_T$
S150 OUTPUT THRESHOLD
RETURN

FIG. 7
START
S2 ACQUIRE ACCELERATION DATA
S4 ACCELERATION ≥CONTROL ALGORITHM START THRESHOLD?
S10 ACQUIRE VEHICLE SPEED
S12 DETERMINE VEHICLE SPEED
S14 VEHICLE SPEED≥HIGH SPEED?
S16 PROCESS ACCELERATION DATA
S20 ACCELERATION>HIGH-SPEED THRESHOLD?
S30 VEHICLE SPEED<LOW SPEED?
S32 PROCESS ACCELERATION DATA
S36 ACCELERATION>LOW-SPEED THRESHOLD?
S40 PROCESS ACCELERATION DATA
S44 ACCELERATION>MEDIUM-SPEED THRESHOLD?
S50 COLLISION FLAG → ON
RETURN
FIG. 8
SPEED
TIME
FIG. 9
SPEED
TIME
FIG. 10
SPEED
TIME
FIG. 11
SPEED
TIME
FIG. 12
SPEED
TIME
FIG. 13
SPEED
TIME
FIG. 14
CALCULATE THRESHOLD
S110 READ VEHICLE SPEED
S120 READ ELAPSED TIME t
S130 SELECT THRESHOLD FUNCTION (LOW, MEDIUM, AND HIGH SPEED)
S140 CALCULATE THRESHOLD $V_T(t)$
S150 OUTPUT THRESHOLD
RETURN
FIG. 15
START
S2 ACQUIRE ACCELERATION DATA
S4 ACCELERATION≥CONTROL ALGORITHM START THRESHOLD?
S10 ACQUIRE VEHICLE SPEED
S12 DETERMINE VEHICLE SPEED
S14 VEHICLE SPEED≥HIGH SPEED?
S16 PROCESS ACCELERATION DATA
S18 CALCULATE SPEED
S22 SPEED>HIGH-SPEED THRESHOLD?
S30 VEHICLE SPEED<LOW SPEED?
S32 PROCESS ACCELERATION DATA
S34 CALCULATE SPEED
S38 SPEED>LOW-SPEED THRESHOLD?
S40 PROCESS ACCELERATION DATA
S42 CALCULATE SPEED
S46 SPEED>MEDIUM-SPEED THRESHOLD?
S50 COLLISION FLAG →ON
RETURN

FIG. 16
START
S2 ACQUIRE ACCELERATION DATA
S4 ACCELERATION≥CONTROL ALGORITHM START THRESHOLD?
S10 ACQUIRE VEHICLE SPEED
S12 DETERMINE VEHICLE SPEED
S14 VEHICLE SPEED≥HIGH SPEED?
S16 PROCESS ACCELERATION DATA
S18 CALCULATE SPEED
S20 ACCELERATION>HIGH-SPEED THRESHOLD?
S22 SPEED>HIGH-SPEED THRESHOLD?
S30 VEHICLE SPEED<LOW SPEED?
S32 PROCESS ACCELERATION DATA
S34 CALCULATE SPEED
S36 ACCELERATION>LOW-SPEED THRESHOLD?
S38 SPEED>LOW-SPEED THRESHOLD?
S40 PROCESS ACCELERATION DATA
S42 CALCULATE SPEED
S44 ACCELERATION>MEDIUM-SPEED THRESHOLD?
S46 SPEED>MEDIUM-SPEED THRESHOLD?
S50 COLLISION FLAG → ON
RETURN

What is claimed is:

1. A control device for an occupant protection device, comprising:
    an acceleration sensor disposed at a front position of a vehicle; and
    a control unit that determines the occurrence of a collision based on an output signal of the acceleration sensor and operates the occupant protection device, wherein
    the acceleration sensor is one satellite sensor disposed offset in a vehicle width direction from a vehicle front center position, and
    the control unit includes:
    a first threshold setting unit that sets a first threshold so as to correspond to a traveling speed of the vehicle; and
    a determining unit that compares a level of the output signal of the acceleration sensor with the first threshold to determine the occurrence of a collision.

2. A control device for an occupant protection device, comprising:
    an acceleration sensor disposed at a front position of a vehicle; and
    a control unit that determines the occurrence of a collision based on an output signal of the acceleration sensor and operates the occupant protection device, wherein
    the acceleration sensor is one satellite sensor disposed offset in a vehicle width direction from a vehicle front center position, and
    the control unit includes:
    a calculating unit that integrates the output signal of the acceleration sensor to output a speed signal;
    a second threshold setting unit that sets a second threshold so as to correspond to a traveling speed of the vehicle; and
    a determining unit that compares a level of the speed signal with the second threshold to determine the occurrence of a collision.

3. A control device for an occupant protection device, comprising:
    an acceleration sensor disposed at a front position of a vehicle; and
    a control unit that determines the occurrence of a collision based on an output signal of the acceleration sensor and operates the occupant protection device, wherein
    the acceleration sensor is one satellite sensor disposed offset in a vehicle width direction from a vehicle front center position, and
    the control unit includes:
    a calculating unit that integrates the output signal of the acceleration sensor to output a speed signal;
    a first threshold setting unit that sets a first threshold so as to correspond to a traveling speed of the vehicle;
    a second threshold setting unit that sets a second threshold so as to correspond to the traveling speed of the vehicle;
    a first determining unit that compares a level of the output signal of the acceleration sensor with the first threshold to determine the occurrence of a collision; and
    a second determining unit that compares the level of the speed signal with the second threshold to determine the occurrence of a collision.

4. The control device for an occupant protection device according to claim 3, wherein
    the second threshold is expressed as a function of time elapsed from the occurrence of a collision, and time-change characteristics of the second threshold are set in accordance with the traveling speed of the vehicle.

5. The control device for an occupant protection device according to claim 3, wherein
    the second threshold is expressed as a function of time elapsed from the occurrence of a collision, and time-change characteristics of the second threshold in an initial stage of collision are changed in accordance with the traveling speed of the vehicle.

6. The control device for an occupant protection device according to claim 2, wherein
    the second threshold is expressed as a function of time elapsed from the occurrence of a collision, and time-change characteristics of the second threshold are set in accordance with the traveling speed of the vehicle.

7. The control device for an occupant protection device according to claim 2, wherein
    the second threshold is expressed as a function of time elapsed from the occurrence of a collision, and time-change characteristics of the second threshold in an initial stage of collision are changed in accordance with the traveling speed of the vehicle.

* * * * *